United States Patent [19]
Dodwell

[11] 3,773,517
[45] Nov. 20, 1973

[54] PRODUCTION OF PHOTOGRAPHIC SILVER HALIDE EMULSIONS

[75] Inventor: Geoffrey Michael Dodwell, Essex, England

[73] Assignee: Ilford Limited, Ilford, England

[22] Filed: Apr. 4, 1972

[21] Appl. No.: 241,064

[30] Foreign Application Priority Data
Apr. 16, 1971 Great Britain............. 9,686/71
Oct. 13, 1971 Great Britain........... 47,683/71

[52] U.S. Cl................. 96/114, 96/114.5, 117/34
[51] Int. Cl............................................. G03c 1/04
[58] Field of Search..................... 96/114; 117/34

[56] References Cited
UNITED STATES PATENTS
3,325,286 6/1967 Nottorf.................. 96/114
3,547,650 12/1970 Pilato.................... 96/114

Primary Examiner—Ronald H. Smith
Attorney—E. F. Wenderoth et al.

[57] ABSTRACT

Photographic silver halide emulsions an produced by means of silver halide, gelatin and a polymer latex. The latter is prepared by copolymerization of a monomer yielding a water insoluble homopolymer and a monomer yielding a watersoluble polymer. Copolymerization takes place in the presence of a salt of an alkyl aryl polyether phosphate and the free acid of such salt or a non-ionic alkyl polyether compound.

12 Claims, No Drawings

PRODUCTION OF PHOTOGRAPHIC SILVER HALIDE EMULSIONS

In practice the colloid binder of a silver halide emulsion has almost always been gelatin but numerous proposals have been made to replace a part of the gelatin with other materials, especially by water-insoluble synthetic polymers in order to increase the dimensional stability of the film. It is usual to add an aqueous latex of the water-insoluble synthetic polymer to an aqueous gelatin silver halide emulsion and then to coat the aqueous mixture in order to incorporate the polymer into the emulsion. However a number of polymer latices have been found unsuitable because of a tendency of the silver halide crystals to cause the water-insoluble polymer of the aqueous latex to coagulate.

It is the object of the present invention to provide a process for the production of a silver halide emulsion wherein the colloid binder comprises both gelatin and a synthetic polymer and wherein the aforementioned tendency for silver halide crystals to cause coagulation of the synthetic polymer during the course of production of the material is reduced.

According to the present invention there is provided a process for the production of a photographic silver halide emulsion layer in which the colloid binder comprises both gelatin and a water-insoluble synthetic polymer, which process comprises forming a polymer latex by copolymerising in an aqueous medium a monomer, the homopolymer of which is water insoluble up to 50 percent by weight of a comonomer the homopolymer of which is water soluble, the copolymerisation step taking place in the presence of a mixture of surface active agents one of which is a salt of an alkyl aryl polyether phosphate of the general formula I:

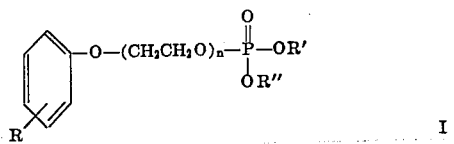

wherein R and R' are each alkyl groups, R'' is an alkali metal atom or an ammonium group or substituted ammonium group and $n$ is at least six and the other of which is either the free acid of the alkyl aryl polyether phosphate of the above formula I where, R, R' and $n$ have the meanings assigned to them above but R'' is a hydrogen atom, or is a non-ionic alkyl polyether condensate of the general formula II:

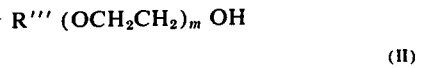

wherein R''' is straight chain alkyl group having from 7–10 carbon atoms and $m$ is an integer from 1–8, the amount of the salt of formula I present being from 20 to 80 percent by weight of the total of the surface active agents present in the mixture, then adding the polymer latex so formed to an aqueous gelatin silver halide emulsion and coating the aqueous emulsion on a photobase and drying the coated layer.

Preferably the polymer latex after formation is first added to an aqueous gelatin solution and the mixed solution is then added to an aqueous gelatin silver halide emulsion.

Preferably when the free acid and the salt of the general formula I are both present they are present in the proportion of 65 percent by weight of the salt and 35 percent by weight of the free acid.

The preferred salts of general formula I are those wherein R'' is a sodium or potassium atom.

The preferred compounds of formula I, both salt and free acid, are those where R is a nonyl or octyl group and wherein R' is an ethyl or methyl group.

The most preferred compounds of formula I, both salt and free acid, are those wherein R is a nonyl group, R' is a methyl group and $n$ is nine.

It is to be understood that when the stated proportions of salt and free acid of the phosphate of formula I are present during the copolymerisation then it is not required that the condensate of formula II be present also, although it may be present. Some salt of the phosphate of formula I must be present and a stabilised latex is not obtained when the copolymerisation takes place in the presence of the free acid of the phosphate of formula I and/or the condensate of formula II only.

Preferably from 2 to 10 g of the mixture of the salt and free acid of the alkyl aryl polyether phosphate of formula I per 100 g of the mixed monomers are present during the copolymerisation stage in the production of the polymer latex.

Preferably when a compound of formula II is present then from 8 to 14 g per 10 g of the alkyl aryl polyether phosphate salt of formula I is used, the total being from 2 to 10 g per 100 g of monomer.

The preferred monomers, the homopolymers of which are water-insoluble, for use in the process of the present invention, are alkyl acrylates or alkyl methacrylates.

The preferred monomers, the homopolymers of which are water-soluble, for use in the process of the present invention, are hydroxy-substituted alkyl acrylates or methacrylates.

When a water-insoluble synthetic polymer is used to partially replace gelatin in a silver halide emulsion usually up to 50 percent by weight of the gelatin may be replaced by the polymer. In the process of the present invention if it is required that the final silver halide emulsion comprises 50 percent gelatin and 50 percent polymer then preferably an aqueous gelatin silver halide emulsion is prepared which comprises 40 percent of the normal quantity of gelatin and to the aqueous emulsion is added the requisite quantity of aqueous polymer latex together with the remainder of the gelatin.

The presence of the mixture of the compounds of formula I, free acid and salt, or of the salt of formula I and the nonionic condensate of formula II during the copolymerisation stage produces a very stable aqueous polymer latex. Further when this latex is added to the aqueous gelatin silver halide emulsion no coagulation of the polymer is caused by the silver halide crystals.

The photobase on to which the aqueous silver halide emulsion is coated in the process of the present invention may be any base of the type used in the production of photographic material, for example it may be a paper base, a film base or a glass base.

The silver halide emulsion of the photographic silver halide emulsion layer produced by the process of the present invention may contain any of the silver halides normally used to produce a silver halide emulsion thus it may be for example a chlorobromide, a chlorobromoiodide, and iodobromide, and iodochloride or a bromoiodide emulsion. Further the emulsion may contain any of the usual addenda present in photographic silver halide emulsion for example stabilizers, antifoggants and polyethylene oxide compounds. Further the silver halide emulsion may have been optically sensitized by the presence therein of an optical sensitizing dye for example a merocyanine or trimethincyanine dye.

It is to be understood that the invention comprises not only the process for the production of a coated silver halide emulsion layer but also coated silver halide emulsion layers prepared by the process and photographic materials which comprise such a layer or layers.

The following Examples will serve to illustrate the invention.

EXAMPLE 1

An aqueous medium was prepared comprising distilled water, (which had been boiled to remove air), 80 g

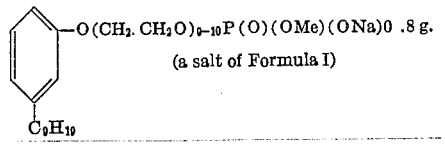

(a salt of Formula I)

| | |
|---|---|
| Sodium metabisulphite | 0.04 g |
| Sodium persulphate | 0.06 g | and the cooled to 80° C and gently stirred while an emulsion of the following was run in during 30 minutes:

| | |
|---|---|
| Distilled water (oxygen free) | 40 g |
| Butyl acrylate (inhibitor free) | 28 g |
| 2-hydroxypropyl methacrylate | 12 g |
| Phosphate salt surfactant of above formula | 0.4 g |
| Octyl alcohol polyether condensate (compound of formula II where n=4) | 2.0 g |
| Sodium persulphate | 0.06 g |
| Sodium metabisulphite | 0.04 g |

The mixture was kept stirred at 80° C for 4 hours and then briefly steam distilled to remove any residual monomer. 168 Mls of this aqueous polymer latex, 20 percent solids, was then added to 880 g of an aqueous chlorobromide emulsion containing 60 percent by weight of the normal amount of gelatin to give a binder of 40 parts of polymer to 60 parts of gelatin.

The emulsion was then coated on to subbed polyester base and the layer dried. It was noted that when the aqueous polymer latex was added to the aqueous chlorobromide emulsion no coagulation of the polymer latex took place.

EXAMPLE II

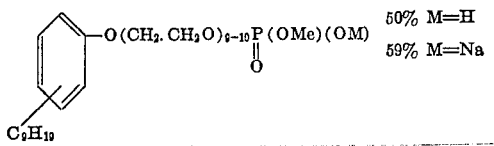

A latex was prepared as in Example I using butyl acrylate copolymerised with 30 percent 2-hydroxyethylmethacrylate in the presence of a mixture of polyether phosphate condensates of the above formula 50 percent being the free acid, 50 percent being the sodium salt (there being no nonionic surface active agent present).

The quantity of phosphates used was 3.5 g to 100 g of the monomers. 160 Mls of the aqueous polymer latex, which contained 33 g of synthetic polymer was added to an aqueous solution which contained 5 g of gelatin and this mixed solution was then added to 880 ml of an aqueous chlorobromide emulsion which contained 45 g of gelatin. The emulsion so formed was coated on subbed polyester base and dried. The colloid of the binder of the dried layer consisted of 40 percent synthetic polymer and 60 percent gelatin. When the aqueous polymer latex was added to the aqueous chlorobromide emulsion no coagulation of the polymer latex was observed.

EXAMPLE III

A medium was prepared consisting of:
1,600 g distilled water
8.1 g alkaryl polyether phosphate acid used in Example II
13.9 g alkaryl polyether phosphate salt used in Example II
1.5 g sodium metabisulphite
0.75 g sodium persulphate This medium was maintained at 80° C with stirring under nitrogen. To this medium was then added simultaneously equal volumes of A and B (as set forth below) at such a rate to maintain the temperature constant.

A. 910 g butyl acrylate
  300 g hydroxypropyl methacrylate
  8.1 g alkyl aryl polyether phosphate acid (as above)
  13.9 g alkyl aryl polyether phosphate salt (as above)

B. 1.200 g water
  1.5 g sodium metabisulphite
  1.5 g sodium persulphate

The final mixture was kept for at 80° C for 2 hours after the completion of the addition of A and B.

The mixture was finally subjected to a short steam distillation to get rid of the uncreated monomers. The final mixture contained 35 percent by weight of synthetic polymer as a latex. 120 Mls of this aqueous polymer latex which contain 60 g of the synthetic polymer was added to an aqueous gelatin solution which contained 15 g gelatin in 150 ml of water. This mixed solution was then added to 1,000 ml of an aqueous silver chlorobromide emulsion containing 60 g gelatin. This emulsion was then coated on to polyester base and dried. The colloid of the dried layer consisted of 45 percent synthetic polymer and 55 percent gelatin. When the aqueous polymer latex was added to the aqueous chlorobromide emulsion no coagulation of the polymer latex was observed.

However in a series of comparative tests the surface active agents used above and in Example I were used alone or in the case of (D) in a mixture excluded from the process of the present invention.

In comparative test (A) a medium was prepared as above but which contained 22 g of the alkaryl polyether phosphate acid used in Example II (and no salt of this phosphate).

A was prepared as above but again 22 g of the alkaryl polyether phosphate acid used in Example II alone was present.

B was prepared as above.

The polymer latex was prepared as above. However when this polymer latex was added to an aqueous chlorobromide emulsion coagulation of all of the polymer was observed and a very uneven coating was obtained.

In comparative test (B) 22 g of the alkaryl polyether phosphate salt used in Example II was used alone both in the medium and in A.

In comparative test (C) 30 g of the octyl polyether condensate of Example I was used alone both in the medium and in A.

In comparative test (D) a mixture 8.1 g of the alkaryl polyether acid together with 20 g of the octyl polyether condensate used in Example I was used both in the medium and in the A.

In each case the polymer latex produced in the above tests (B), (C) and (D) when added to an aqueous chlorobromide emulsion coagulation of all the polymer was observed and again in each case a very uneven coating was obtained.

I claim:

1. A process for the production of a photographic silver halide emulsion layer in which the colloid binder comprises both gelatin and a water-insoluble synthetic polymer, which process comprises forming a polymer latex by copolymerising in an aqueous medium a monomer, the homopolymer of which is water insoluble and up to 50 percent by weight of a comonomer the homopolymer of which is water soluble, the copolymerisation step taking place in the presence of a mixture of surface active agents one of which is a salt of an alkyl aryl polyether phosphate of the general formula

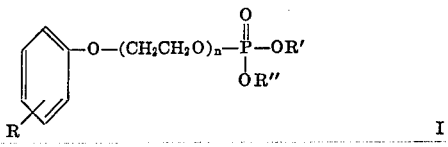

I wherein R and R' are each alkyl groups, R'' is an alkali metal or an ammonium or substituted ammonium group and $n$ is at least six, and the other of which is either the free acid of the alkyl aryl polyether phosphate of the above formula I wherein R, R' and $n$ have the meanings assigned to them above but R'' is a hydrogen atom, or is a non-ionic alkyl polyether condensate of the general formula

(II)

where R''' is a straight chain alkyl group having from 7-10 carbon atoms and $m$ is an integer from 1-8, the amount of the salt of formula I present during copolymerisation being from 20 to 80 percent by weight of the total of the surface active agents present in the mixture, then adding the polymer latex so formed to an aqueous gelatin silver halide emulsion and coating the aqueous emulsion on a photobase and drying the coated layer.

2. A process according to claim 1, wherein the polymer latex after formation is first added to an aqueous gelatin solution and the mixed solution is then added to an aqueous gelatin silver halide emulsion.

3. A process according to claim 1, wherein the copolymerisation step takes place in the presence of 65 percent by weight of the salt and 35 percent by weight of the free acid.

4. A process according to claim 1, wherein R'' in formula I is a sodium or a potassium atom.

5. A process according to claim 1, wherein in formula R is a nonyl or octyl group and R' is a methyl or an ethyl group.

6. A process according to claim 5, wherein in formula I R is a nonyl group, R' is a methyl group and $n$ is 9.

7. A process according to claim 1, wherein from 2 to 10 g of the mixture of the salt and the free acid of the alkyl aryl polyether defined in claim 1 per 100 g of the mixed monomers are present during the copolymerisation.

8. A process according to claim 4, wherein the alkyl aryl polyether phosphate salt is present together with an alkyl polyether condensate of formula II defined in claim 1.

9. A process according to claim 8, wherein the total weight of the surface active agents present during copolymerisation is from 2-10 g per 100 of the monomer present.

10. A process according to claim 9, wherein from 8 to 14 g of the alkyl polyether condensate is present during copolymerisation per every 10 g of the alkyl aryl polyether phosphate salt present.

11. A process according to claim 1, wherein the monomers the homopolymer of which is water insoluble is an alkyl acrylate or an alkyl methacrylate.

12. A process according to claim 1, wherein the monomer the homopolymer of which is water soluble is a hydroxy substituted alkyl acrylate or methacrylate.

* * * * *